United States Patent [19]
Perrine

[11] 4,159,181
[45] Jun. 26, 1979

[54] MIXING AND PELLETIZING MACHINE
[75] Inventor: Paul M. Perrine, Aurora, Ind.
[73] Assignee: American Pelletizing Corporation, Des Moines, Iowa
[21] Appl. No.: 754,026
[22] Filed: Dec. 23, 1976
[51] Int. Cl.² ............................. B01F 5/04; B01F 7/02
[52] U.S. Cl. .................................... 366/172; 366/280; 366/326; 366/DIG. 607
[58] Field of Search ...................... 259/9, 10, 109, 110, 259/178 R, DIG. 42, 44, 45; 198/659, 673; 366/172, 280, 326, DIG. 607

[56] References Cited
U.S. PATENT DOCUMENTS

| 850,952 | 4/1907 | McCutcheon | 259/9 |
| 903,030 | 11/1908 | Tyson | 259/9 |
| 991,487 | 5/1911 | Deats | 259/9 |
| 2,697,510 | 12/1954 | Morrison | 198/659 |
| 3,162,428 | 12/1964 | Lodge et al. | 259/178 R |

Primary Examiner—Harvey C. Hornsby
Assistant Examiner—Timothy F. Simone
Attorney, Agent, or Firm—Zarley, McKee, Thomte, Voorhees & Sease

[57] ABSTRACT

A mixing and pelletizing chamber includes a semicylindrical flexible trough of rubber or other material in which a rotor assembly mixes and pelletizes material moved from an inlet end to an outlet end. Springs are attached to the trough to resist movement of the trough in the direction of the rotation of the rotor assembly. The rotor assembly includes an axial shaft having transversely extending arms with blades at their outer ends with every fourth arm and blade being in a common plane. The blades are symmetrical and have converging flat surface to control product retention time in the pelletizer and are adjustably connected to the arms for providing adjustment of the force of the conveying action to the material in the trough. Adjustment is provided by aligned slots on opposite sides of the tubular arms receiving bolts on which the blades are carried. Optionally, the blade may nest in a semicylindrical portion of the tubular arm for angular adjustment.

18 Claims, 8 Drawing Figures

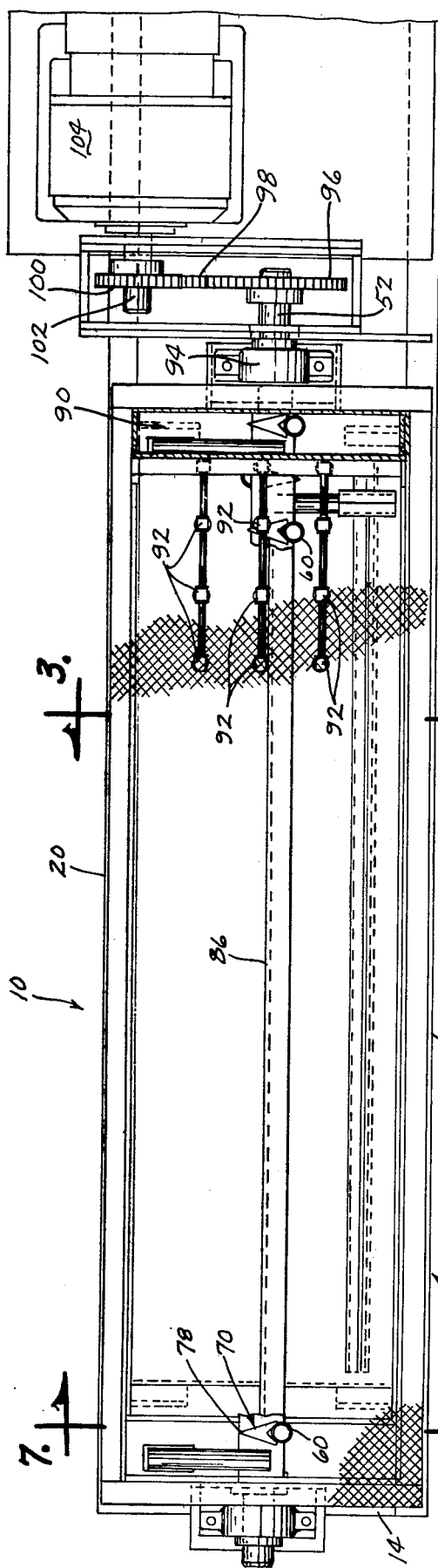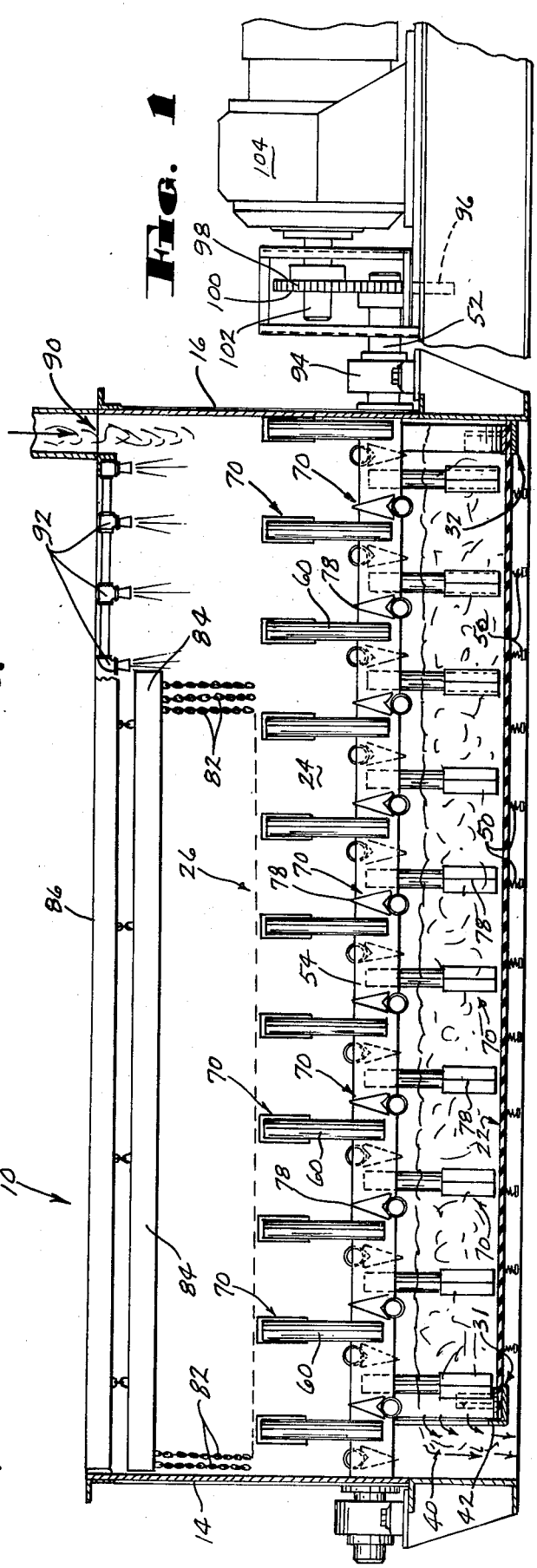

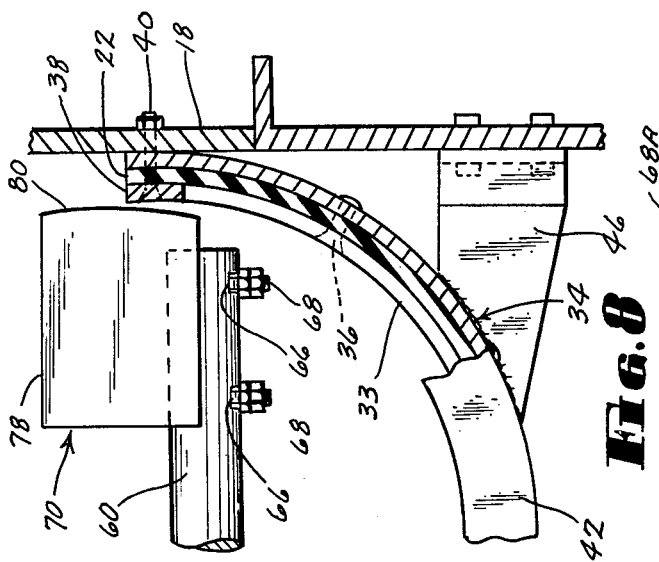
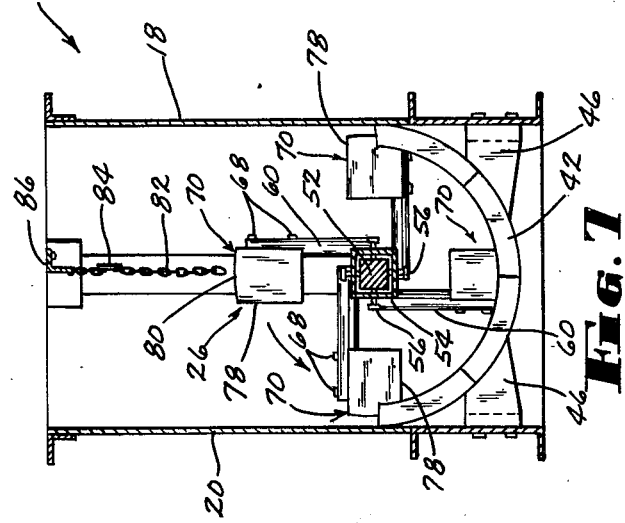
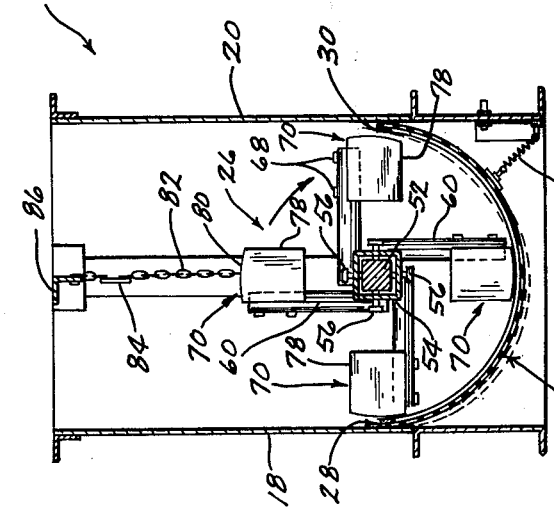
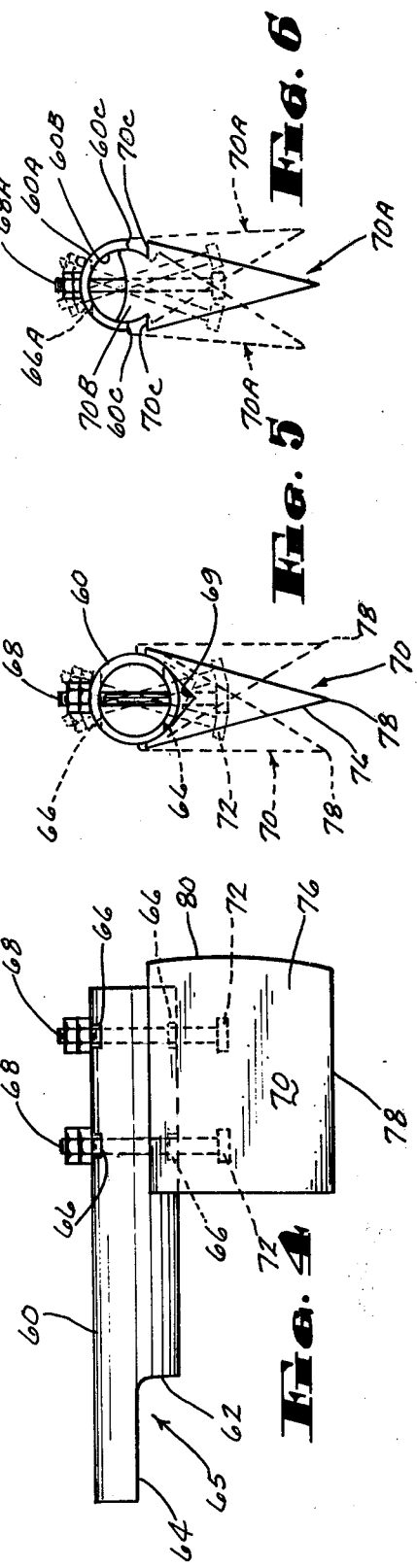

MIXING AND PELLETIZING MACHINE

BACKGROUND OF THE INVENTION

It is desirable to convert dusty or fine products such as ground limestone and gypsum into pellets for easier handling and elimination of dust. Previously this required considerable equipment as it was necessary to mix the binder, activator, and product to be agglomerated and then agglomerate the mix into pellets in a separate machine such as a pan pelletizer or compactor or drum granulator. The cost of this equipment was substantial and the product output was low. The high percentage of oversized and undersized pellets was also a problem of known agglomeration devices.

SUMMERY OF THE INVENTION

The mixing and pelletizing machine of this invention continuously mixes the binder, activator and product to be agglomerated and then agglomerates the mix into pellets. The machine is operated at speeds on the order of 100 r.p.m. and causes violent stirring of the ingredients which provides high intensity mixing which requires less binder activator and less binder for a given pellet strength because of the mixing action and severe agitation resulting in the particles being more tightly bonded together. Pellet size is easily adjusted either by changing rotor operating speed or liquid content or tip angle which changes retention time. As speed is increased, product size decreases and vice versa. As moisture content increases, product size increases and vice versa. As retention time increases, product size becomes more uniform.

In other types of equipment oversized pellets are the result of buildup on the walls of the mixing chamber and on the agitator followed by the buildup shedding and leaving oversized pellets. This machine includes a flexible rubber trough in which the rotor assembly turns and the trough is spring biased to resist the forces applied to it by the rotor assembly as it turns and thus the trough is in a constant state of flexing whereby material buildup is prevented. Material buildup on the rotor blades is prevented by providing blades which have flat converging surfaces meeting to form a sharp edge. The angle between the blade surfaces is less than 45° and the blades are angled slightly to a transversely extending plane to control the conveying action to the material. Every fourth blade and arm connected to an axial shaft is in a common plane and the arms are in substantial contiguous relationship along the axial shaft. Conveying action is due to spiraling of arms along the shaft.

The material to be mixed and agglomerated is fed in one end and water is sprayed onto it at the inlet end. Further break up of the larger pieces is accomplished by a row of hanging chain elements positioned over the rotor assembly. A discharge end of the trough is substantially open but includes a short weir flange element. The trough is approximately ten feet long and is rigidly supported only at its opposite ends leaving its substantial length free to flex to prevent material buildup. The rubber material also minimizes wear and friction losses thereby requiring less power to operate the rotor assembly.

A machine ten feet long, 36 inches deep and 30 inches wide can be easily operated by 40 horse power motor at 100 r.p.m. and produce 45 tons of pelletized gypsum or limestone per hour.

Examples of products and the method of producing them in the mixing and pelletizing machine of this invention are disclosed in my co-pending applications, Ser. No. 534,687, filed Dec. 20, 1974, and Ser. No. 708,986, filed July 26, 1976, incorporated herein by reference.

DESCRIPTION OF THE DRAWINGS

FIG. 1 is a cross sectional side elevation view of the mixing and pelletizing machine of this invention.

FIG. 2 is a top plan view thereof.

FIG. 3 is a cross sectional view taken along line 3—3 in FIG. 2.

FIG. 4 is a side elevation view of an arm and blade.

FIG. 5 is an end view of the arm and blade of FIG. 4 illustrating the blade in different positions of adjustment.

FIG. 6 is a view similar to FIG. 5 but showing an optional means of adjustably mounting a blade to an arm.

FIG. 7 is a cross sectional view taken along line 7—7 in FIG. 2 illustrating the discharge end of the machine.

FIG. 8 is an enlarged fragmentary cross sectional view of the trough end structure and its connection to the enclosure sidewall.

DESCRIPTION OF PREFERRED EMBODIMENT

The mixing and pelletizing machine of this invention is referred to generally in FIG. 1 by the reference numeral 10 and includes an elongated enclosure 12 having opposite end walls 14 and 16 and sidewalls 18 and 20 which cooperate with a semicylindrical trough bottom 22 to form a mixing and agglomerating chamber 24 in which a rotor assembly 26 is positioned.

The trough 22 is formed of rubber material to provide flexibility and is supported only along its longitudinal top edges 28 and 30 where it is secured to the enclosure sidewalls 18 and 20. Only the opposite ends 31 and 32 are inflexible and as seen in FIG. 8, include top and bottom steel straps 33 and 34 interconnected by bolts 36. The top strap 33 terminates short of the upper ends to allow a longitudinally extending metal strap 38 to be positioned against the inner surface of the rubber trough 22 and clamp it to the bottom strap 34 and enclosure sidewall 18 through the use of bolts 40. The relatively inflexible ends 31 and 32 are similar although the end 33 is positioned tightly against the end wall 16, as seen in FIG. 1, to provide a seal and the end 31 is spaced approximately six inches from the end wall 14 to allow for discharge of pelletized material 40 over an arcuate weir flange 42 including four sections welded together into the support plates 33 and 34. The enclosure sidewalls 18 and 20 further support the ends 31 and 22 of the trough 22 by the horizontally extending supports 46 bolted to the sidewalls extending inwardly and being welded to the bottom support plate 34.

The rotor assembly 26 turning clockwise, as seen in FIG. 3, tends to shift the rubber trough 22 to the left when filled with material and this tendency is resisted by a plurality of longitudinally spaced apart springs 50 secured to the lower edge of the enclosure sidewall 20 and to the trough 22. Accordingly, as the trough tends to shift to the left the springs 50 tend to return it and thus keep it in a constant state of flexing, as indicated by the dashlines in FIG. 3, and thereby prevent the buildup of material on the inside of the trough.

The rotor assembly 26 includes a solid axial shaft 52 extending the full length of the enclosure in a horizontal plane containing the top edges of the trough 22. An outer tube 54 is adjustably mounted to the solid shaft 52 by setscrews 56 which allow for balancing of the rotor assembly. A plurality of arms 60 carrying blades 70 are positioned on the square tube 54 in side-by-side contiguous relationship along the full length of the tube 54. The arms 60 are tubular and are mounted in a spiral fashion around the four surfaces of the tube 54 by two surfaces engaging surfaces 62 and 64 of a notch 65 on the inner end of the arm 60. The arm is then secured by being welded to the tube 54. The outer ends of the arms 60 include two pairs of oppositely disposed slots 66 through which bolts 68 extend for adjustably connecting the V-shaped inner ends 69 on the blades 70 to the tubular arms 60. The outer ends 72 of the bolts 68 are integral with the blades 70.

The blades 70 are symmetrical in shape and have converging flat side surfaces 74 and 76 meeting to form a sharp edge 78. The angle between the flat surfaces 74 and 76 is preferably 30° and at least less than 45°. The blade has a rounded outer end surface 80 to conform to the curved surface of the trough 22 during operation. The unique arrangement and design of the arms 60 provides full coverage of trough and the blades 70 prevent buildup of material on the blades 70 which is sluffed off from forming lumps.

In FIG. 6, an optional mounting arrangement is shown for connecting the blades 70A to the arm 60A wherein the arm 60A is semicylindrical in cross section and receives a blade having an inner convex end 70B which matingly engages the concave surface 60B of the arm 60A. Shoulders 70C on opposite sides of the blade 70A limit angular adjustment by engagement with the edges 60C of the semicylindrical tube portion 60A. Bolts 68A extend through a single slot 66A in the bottom of the tube portion 60A and thereby allow angular pivotal movement of the blades 70A for pivoting between the extreme dashline positions illustrated in FIG. 6.

Only slight angular adjustment of the blades 70 relative to a transversely extending plane is required since only a slight change in rotor tip direction changes the retention time of the product in the pelletizer. FIGS. 5 and 6 represent the extreme adjustment positions that are possible. It is thus seen that every fourth arm 60 and blade 70 is in a common plane which is parallel to a plane containing arms and blades on the opposite side of the shaft, as seen in FIGS. 3 and 7.

Larger pieces of material in the mixing and pelletizing chamber 24 may be broken up by being thrown against a row of hanging chain elements 82 connected to a longitudinally extending plate 84 secured to a longitudinally extending center frame member 86 directly over the rotor assembly 26, as seen in FIGS. 1 and 3.

The enclosure includes a rectangular in shape feed opening 90 at the end wall 16 over the rotor assembly 26 and a series of water spray nozzles 92 are provided in three rows across the width of the enclosure, as seen in FIG. 2, next to the inlet opening 90.

The rotor shaft 52 extends out of the enclosure end wall 16 through a bearing 94 into engagement with a sprocket 96 driven by a chain 98 connected to a sprocket 100 on a shaft 102 connected to a motor 104.

In operation it is seen that the material to be pelletized such as, but not limited to, limestone or gypsum and an appropriate binder and activator, is fed into the inlet opening 90 with moisture being added from the nozzles 92 whereupon mixing and pelletizing occurs as the material is worked by the rotor assembly 26 which moves the material as it is mixed the full length of the machine to the discharge opening 40 where the material is discharged as pellets. A preferred embodiment of the machine is 30 inches wide by 36 inches deep and 10 feet in length and the rotor assembly is operated by approximately 100 r.p.m. by a 40 horse power motor. The high speeds of the rotor assembly throw the material outwardly and provide high intensity mixing while violently stirring the ingredients. The blades 70 have a plow action as they move through the material. The special design of the blades 70 wherein they are symmetrical in shape and include flat converging surfaces meeting to form a sharp leading edge whereby material buildup which is shedded does not produce lumps and oversized pellets. The same is true with the unique trough construction wherein rubber is used to provide flexibility and the spring action produced by the springs 50 tending to resist the rotation forces of the rotor assembly 26 maintains the trough in a continuous state of flexing thus preventing material buildup on the trough, as seen by the dashlines in FIG. 3. The weir 42 is only high enough at the discharge end to prevent unpelletized small fines and lumps from being discharged. Thus it is seen that a variety of different types of finely divided materials may be pelletized by the combined mixing and pelletizing action of this machine which produces pellets of a uniform size.

I claim:
1. A mixing and pelletizing machine comprising,
an elongated enclosure having a horizontally disposed trough, opposite sidewalls and end walls and said trough having inlet and outlet opposite ends,
a rotor assembly extending the length of said trough between said opposite end walls and including an axial shaft having a plurality of radially extending arms along the substantial length of said shaft,
power means for rotating said rotor assembly at speeds on the order of 100 R.P.M. to provide approximately 400 to 1,500 feet per minute blade tip speed,
a blade having a uniform cross section lengthwise on the outer end of each arm disposed in a substantially vertical transversely extending plane substantially common to said arm and blade, said blade being elongated and wedge shaped and having oppositely disposed symetrical converging flat surfaces forming a sharp leading cutting edge facing the direction of rotor rotation and rotation of said rotor assembly being adapted to mix and pelletize material introduced into said trough inlet end as it is moved by said blades to said outlet end,
water spray means across the width of the inlet end only and at the top of the enclosure for spraying water onto the material introduced into said trough to wet the material,
a wall of hanging chain elements at the top of the enclosure extending to adjacent the rotor assembly and extending from the water spray means to the outlet end for breaking up material in the enclosure thrown against the chain elements by the rotor assembly, and
said trough being formed of flexible material suspended between said sidewalls and means being operatively connected to said trough for resisting movement of said trough in the direction of the rotor assembly rotation thereby causing said trough to continuously flex as said rotor assembly is rotate thereby preventing material buildup in said trough.

2. The structure of claim 1 wherein said means for resisting movement of said trough is a spring means.

3. The structure of claim 1 wherein said includes an outer free end edge which is rounded to conform to the curvature of said trough and is closely spaced from said trough.

4. The structure of claim 1 wherein said blades are carried on radially extending arms and each blade includes a bolt extending through aligned oppositely disposed slots on said tubular arms.

5. The structure of claim 1 wherein said rotor assembly is supported between said end walls by a multisided shaft being rotatably supported between said end walls and said rotor assembly includes a multisided sleeve through which said shaft extends in mating engagement.

6. The structure of claim 5 wherein said sleeve is radially adjustably fitted to said shaft and adjustment means is provided for selectively locking said sleeve to said shaft for balancing said rotor assembly.

7. The structure of claim 1 wherein said arcuate trough is further defined as being semicylindrical in shape.

8. The structure of claim 1 wherein said trough is supported only at its ends and is substantially free to flex along its substantial length.

9. The structure of claim 1 wherein said trough includes a rigid arcuate frame at each end supporting said trough and connected to said sidewalls.

10. The structure of claim 1 wherein said frame includes top and bottom plates on opposite sides of said flexible trough with fastening means securing said plates and trough together.

11. The structure of claim 1 wherein said flexible material in said trough is further defined as being rubber material.

12. The structure of claim 9 wherein said trough at the outlet end is substantially open for discharge of pelletized material.

13. The structure of claim 12 wherein said substantially open outlet end of said trough includes a transversely extending vertically disposed weir having a height substantially less than the radius of curvature of said arcuate trough.

14. The structure of claim 1 wherein said arms and blades are closely spaced longitudinally along said trough in a spiral arrangement and are spaced 90° apart radially whereby every fourth arm and blade is in a common plane.

15. The structure of claim 14 wherein the spacing between adjacent arms and blades is further defined by adjacent arms and blades being in substantially contiguous and separate transversely extending planes.

16. The structure of claim 15 wherein adjustment means is provided for connecting said blades to said arms for moving said blades to positions at a small angle to said transversely extending planes whereby rotation of said rotor assembly provides a conveying action for moving said material from said inlet end to said outlet end.

17. The structure of claim 1 wherein the angle between said blade converging surfaces is less than 45°.

18. The structure of claim 17 wherein said angle between said blade converging surfaces is further defined as being approximately 30°.

* * * * *

UNITED STATES PATENT AND TRADEMARK OFFICE
CERTIFICATE OF CORRECTION

PATENT NO. : 4,159,181

DATED : June 26, 1979

INVENTOR(S) : Paul M. Perrine

It is certified that error appears in the above—identified patent and that said Letters Patent are hereby corrected as shown below:

Claim 3, first line, after "said" insert - blade - .

Claim 8 in the patent was original claim 16 of the application and was canceled in an amendment filed April 20, 1978 and therefore should not appear in the patent.

Claim 11 was allowed in Office Action, Paper No. 15, dated October 25, 1978, and should be included in the patent as follows:

"The structure of claim 28 wherein said blades are carried on radially extending arms and each arm includes a concave portion in which a blade is received, and said blade includes a convex surface for mating engagement with said concave portion, and a bolt connected to said blade extends through a slot in said concave portion to adjustably secure said blade to said arm."

Signed and Sealed this

Twenty-sixth Day of January 1982

[SEAL]

Attest:

Attesting Officer

GERALD J. MOSSINGHOFF

Commissioner of Patents and Trademarks